United States Patent
Crockett et al.

[19]

[11] Patent Number: 6,052,758

[45] Date of Patent: Apr. 18, 2000

[54] INTERFACE ERROR DETECTION AND ISOLATION IN A DIRECT ACCESS STORAGE DEVICE DASD SYSTEM

[75] Inventors: Robert Nelson Crockett; Ronald Maynard Kern; Gregory Edward McBride, all of Tucson, Ariz.

[73] Assignee: International Business Machines Corporation, Armonk, N.Y.

[21] Appl. No.: 08/996,055

[22] Filed: Dec. 22, 1997

[51] Int. Cl.[7] ..................................................... G06F 13/00
[52] U.S. Cl. .............................................................. 711/113
[58] Field of Search ............................................ 711/113

[56] References Cited

U.S. PATENT DOCUMENTS

| | | | |
|---|---|---|---|
| 5,119,377 | 6/1992 | Cobb et al. ................................. | 714/38 |
| 5,153,881 | 10/1992 | Bruckert et al. ........................... | 714/10 |
| 5,157,668 | 10/1992 | Buenzli, Jr. et al. ...................... | 714/26 |
| 5,544,308 | 8/1996 | Giordano et al. .......................... | 714/26 |
| 5,581,688 | 12/1996 | Jiang et al. ................................. | 714/3 |
| 5,615,329 | 3/1997 | Kern et al. .................................. | 714/6 |

OTHER PUBLICATIONS

IBM Corporation Manual, DFSMS/MVS Version 1, "Remote Copy Administrator's Guide and Reference", 1994, 1996 (entire document).

IBM Corporation, Internet article, http://www.storage.ibm-.com/storage/software/sms/remcopy.htm, "DFSMS/MVS: Remote Copy", 1996 (entire document).

IBM Corporation, Internet article, http://www.storage.ibm-.com/storage/software/sms/sysmngd.htm, 1996 (entire document).

*Primary Examiner*—David L. Robertson
*Attorney, Agent, or Firm*—David W. Victor; Konrad Raynes & Victor LLP

[57] ABSTRACT

Disclosed is a system for isolating errors in a remote copy system. A first controller writes data to a volume in a first direct access storage device (DASD) and maintains a copy of the data in a cache. The first controller transfers the data in the cache to a host system via a first communication line. The host system then transfers the data transferred from the first controller to a second controller via a second communication line. The second controller writes the data transferred from the host system to a volume in a second DASD. A volume pair is comprised of a volume in the first DASD and a volume in the second DASD, wherein for each volume pair, the second DASD volume backs-up data stored in the first DASD volume. If an error related to a volume pair is detected, then the operation of transferring the data in the cache for the volume pair related to the error to the second controller via the host system is suspended. Information on the detected error is written to a first data set. Further, after the transfer of data from the cache is suspended, information on a location of data written to the first DASD volume in the volume pair related to the error is written to a second data set. The information in the second data set is used to determine the location of data written to the first DASD volume of the volume pair related to the error while the transfer of the data to the second DASD volume of the volume pair is suspended. Upon correction of the error related to the volume pair, data written to the first DASD volume at the determined location is transferred to the second storage controller via the host system for storage in the second DASD volume of the volume pair.

23 Claims, 3 Drawing Sheets

INTERFACE ERROR DETECTION AND ISOLATION IN A DIRECT ACCESS STORAGE DEVICE DASD SYSTEM

FIELD OF THE INVENTION

The invention relates to a system for detecting and isolating errors in a direct access storage device (DASD).

BACKGROUND OF THE RELATED ART

Catastrophic computer system disasters may occur suddenly and immediately halt all processing within the system at a single point in time. However, it is more common that an error interrupts operations in stages, occurring over several seconds or even minutes. One such system to handle system failures is a remote copy system. Remote copy is based on two systems, a primary application system at one location and a recovery system at another location. Both systems can be located in the same building, or at remote locations. Each system has a dedicated direct access storage device (DASD). The DASD dedicated to the recovery location backs-up data written to the DASD dedicated to the primary application system. In case of disaster at the primary location, data is recovered from the secondary DASD located at the recovery system.

International Business Machines Corporation (IBM) provides two remote copy systems utilizing the IBM 3990 Model 6 storage controller, the Peer-to-Peer-Remote Copy (PPRC) and Extended Remote Copy (XRC). Both these systems address the problem of unrecoverable data that occurs between the last, safe backup of an application system to a recovery system and the time when the application system fails.

PPRC provides a synchronous copy of data to the secondary DASD in that the primary controller delays further input/output (I/O) operations to a DASD until all data has been copied to the secondary DASD. With PPRC, a primary controller communicates directly with a secondary controller. The secondary controller backs-up data the primary controller stores in an associated DASD. XRC provides an asynchronous copy of data to the secondary DASD such that operations at the primary controller are allowed to continue before all data has been copied to the secondary DASD. XRC includes a data mover system to move data between the primary and secondary controllers. This process of using a secondary controller and DASD to shadow data maintained in the primary DASD is described in U.S. Pat. No. 5,615,329 to Robert F. Kern et al., and assigned to IBM, the assignee of the subject patent application, which is incorporated herein by reference in its entirety.

Present data shadowing and remote copy systems involving primary and secondary controllers have limited error diagnostic and recovery operations. For instance, with the XRC system, the system is reinitialized and resynchronized after an error is detected and corrected.

SUMMARY OF THE INVENTION

Preferred embodiments of the present invention disclose a system for isolating errors in a remote copy system. A first controller writes data to a volume in a first direct access storage device (DASD) and maintains a copy of the data in a cache. The first controller transfers the data in the cache to a host system via a first communication line. The host system then transfers the data transferred from the first controller to a second controller via a second communication line. The second controller writes the data transferred from the host system to a volume in a second DASD. A volume pair is comprised of a volume in the first DASD and a volume in the second DASD, wherein for each volume pair, the second DASD volume backs-up data stored in the first DASD volume. If an error related to a volume pair is detected, then the operation of transferring the data in the cache for the volume pair related to the error to the second controller via the host system is suspended. Information on the detected error is written to a first data set. Further, after the transfer of data from the cache is suspended, information on a location of data written to the first DASD volume in the volume pair related to the error is written to a second data set. The information in the second data set is used to determine the location of data written to the first DASD volume of the volume pair related to the error while the transfer of the data to the second DASD volume of the volume pair is suspended. Upon correction of the error related to the volume pair, data written to the first DASD volume at the determined location is transferred to the second storage controller via the host system for storage in the second DASD volume of the volume pair.

It is an object of preferred embodiments of the present invention to provide a secondary DASD and controller to back-up information maintained in a primary DASD by a primary controller. Information is backed-up on a volume-by-volume basis.

It is a further object of the present invention to isolate errors to the lowest level of granularity and to minimize the damage caused by an error in a real-time complex environment.

It is still a further object that in isolating an error, if possible, other operations continue unabated.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
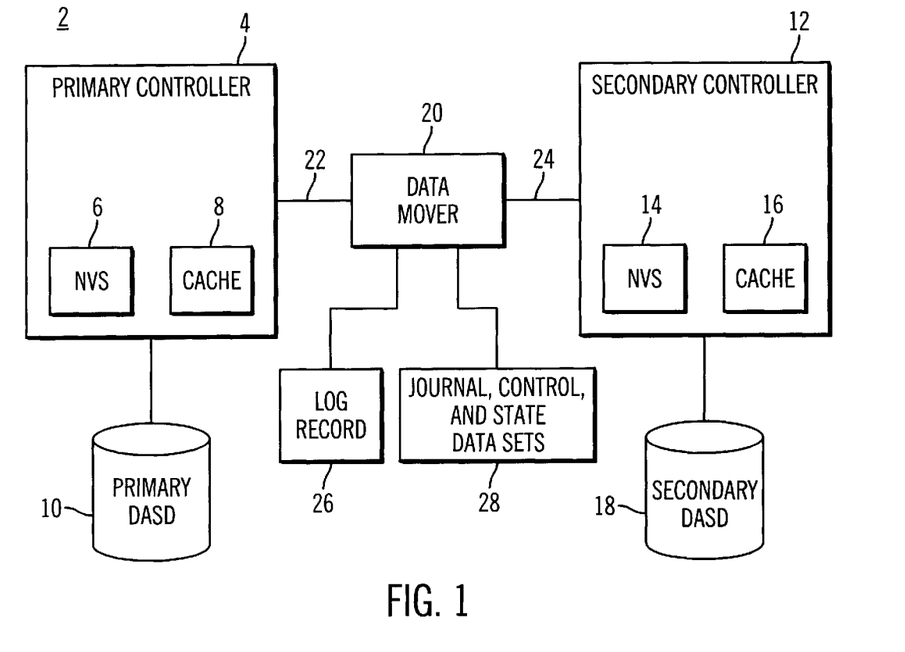
FIG. 1 illustrates a block diagram of the components and architecture of a preferred embodiment of a remote copy system in accordance with preferred embodiments of the present invention.

FIG. 1 is a block diagram illustrating a preferred hardware and software embodiment of a remote copy system 2 in accordance with the present invention. A primary controller 4 includes a non-volatile storage unit (NVS) 6 and a cache 8 to store modified data. The cache 8 stores frequently used data and the NVS 6 maintains copies of all modified data in the cache. The primary controller 4 controls I/O operations for a primary direct access storage device (DASD) 10. A secondary controller 12 also includes an NVS 14 and a cache 16. The secondary controller 12 controls I/O operations for a secondary DASD 18. The primary and secondary controllers 4, 12 may be the IBM 3990 Model 6 controller, which provides remote copy capability. The DASDs 10, 18 may be comprised of any non-volatile, long term storage medium, e.g., one or more magnetic hard disk drives, optical disks, tape drives, holographic units, etc. In preferred embodiments, the DASDs 10, 18 are comprised of the IBM RAMAC Array DASD or an attached IBM 3390 DASD. In preferred embodiments, data in the DASDs 10, 18 is stored in the IBM extended count-key-data (ECKD) format, wherein a plurality of records, which may be of variable length, are maintained on tracks.

The DASDs 10, 18 are arranged into volumes, wherein a volume is identified by a unique serial number and may be accessed by any of a set of related addresses. A volume pair relationship is established between a volume in the primary DASD 10 and the secondary DASD 18, such that for each volume pair, the secondary DASD 18 volume shadows or mirrors the data contained in the primary DASD 10. In preferred embodiments, the secondary DASD 18 volumes are dedicated exclusively to backup the primary DASD 10 volumes. This insures that no write I/O operations are made to the secondary DASD 18 volumes backing up the primary DASD 10 volumes. In preferred embodiments, the secondary DASD 18 volumes provide an image on a volume and record basis, such that there is a one-to-one correspondence between the records on the volume tracks in the primary DASD 10 and the records on the volume tracks in the secondary DASD 18. To insure consistency, the secondary DASD 18 must have the same track size and number of tracks per cylinder, and the same or larger volume capacity as the primary DASD 10.

A data mover application 20 reads modified data from the cache 8 in the primary controller 4 and transfers the data to the secondary controller 12 for transfer to the secondary DASD 18. The data mover 20 may read from the cache at predetermined intervals. The data mover 20 may be implemented on a mainframe, server or workstation. In preferred embodiments, the data mover application 20 is implemented on a platform including the IBM ESA/390 hardware and an IBM ES/9000 environment. The data mover 20 includes software to move data between the controllers 4, 12, such as the IBM DFSMS/MVS software.

The data mover 20 may be embedded in the platform housing the primary controller 4, in the platform housing the secondary controller 12 or on a separate hardware platform. Alternatively, the components of the data mover 20 may be distributed between the platforms of the primary and secondary controllers 4, 12. However, the data mover 20 must be included in a platform(s) connected to the DASD volumes 10, 18 being updated. In preferred embodiments, the IBM Enterprise System Connection (ESCON) components are used to link the primary and secondary controllers 4, 12 to the data mover application 20.

In the embodiment of FIG. 1, the data mover 20 is embedded in a platform external to the primary and secondary controllers 10, 18, and is linked to the controllers 4, 12 via lines 22, 24. In preferred embodiments the lines 22, 24 are fiber optic lines which connect to ESCON ports (not shown) in the primary and secondary controllers 10, 18. Those skilled in the art will appreciate that alternative means, employing alternative communication formats, may be used to link the two controllers 10, 18 with the data mover 20.

Associated with the data mover 20 are two memory locations, a log record 26 and a journal, control, and state data sets 28. The log record 26 maintains error information describing the error or failure that occurred in the remote copy system. During normal, non-recovery operations, the data mover application 20 monitors all I/O operations performed by the primary and secondary controllers 4, 12, maintains information on the changes made to the primary DASD 10, and updates the secondary DASD 18 with the changes. The journal portion of the journal, control, and state data sets 28 contains checkpoint records of changes made to the volumes in the primary DASD 10. The control data set includes information on the last set of data written to the journal data set, the amount of unwritten data that exists in the journal, and the location of the unwritten data in the primary DASD 10. The control state data set is used to determine which data written to the primary DASD 10 has not been backed-up in the secondary DASD 18. The state data set defines and contains the status of the current session and associated volume pairs currently managed by the data mover application 20. The journal, control, and state data sets 28 are updated by the data mover 20 on a continual basis. Moreover, the data mover 20 may maintain copies of the journal, control, and state data sets 28 in the primary and secondary DASD 18 or any other suitable location. In alternative embodiments, the primary controller 4 may update information in the log record 26 and/or in the journal, control, and state data sets 28.

The data mover 20 time stamps data updates in the primary DASD 10 to insure that updates are done in the secondary DASD 18 in the same order as they were done in the primary DASD 10. Dependent writes are those write operations which cannot occur until a previous write operation has occurred, i.e., the write is dependent on the occurrence of a prior write. The data mover application 20 reports a consistency time which indicates the latest time at which the data mover application 20 guarantees the consistency of data written to the secondary DASD 18, i.e., that data was written in the same order such data was written to the primary DASD 10. If there are multiple primary controllers 4 handling I/O operations to the primary DASD 10, then the data mover 20 would include a system clock, such as the IBM 9037 sysplex timer, to maintain data consistency across multiple primary controllers 4.

The hardware and software configuration of the data mover 20, primary and secondary DASDs 10, 18, and controllers 4, 12 is further described in "DFSMS/MVS Version 1 Remote Copy Administrator's Guide and Reference" (IBM Publication, Document No. SC35-0169-02, Copyright IBM 1994, 1996), which is incorporated herein by reference in its entirety.

Error Detection and Isolation

Figure 2A:
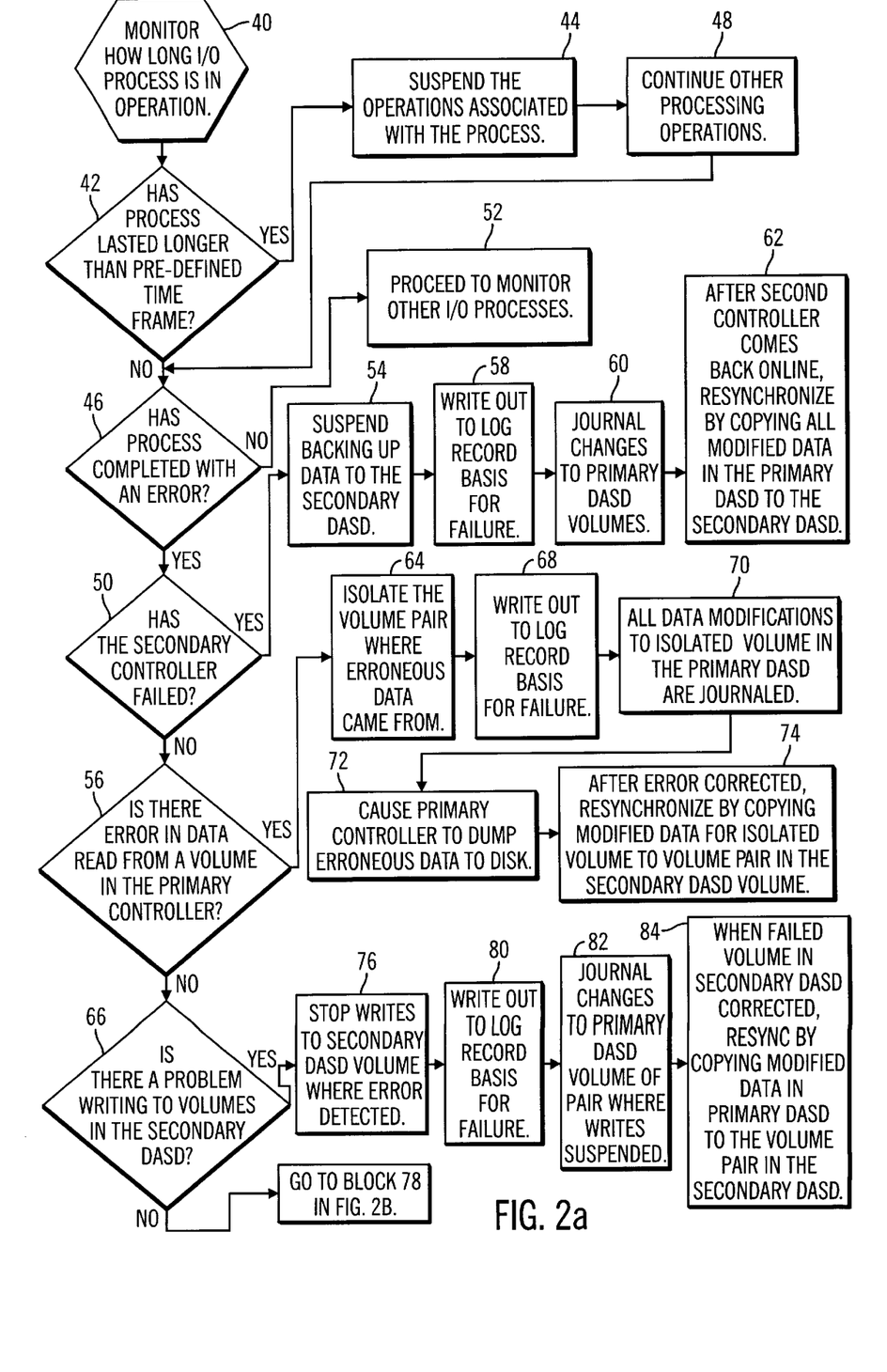
FIGS. 2a and 2b are flowcharts that illustrate general logic implemented in the remote copy system and/or the controllers to transfer data between the primary and secondary DASDs and isolate errors in accordance with a preferred embodiment of the present invention.
Figure 2B:
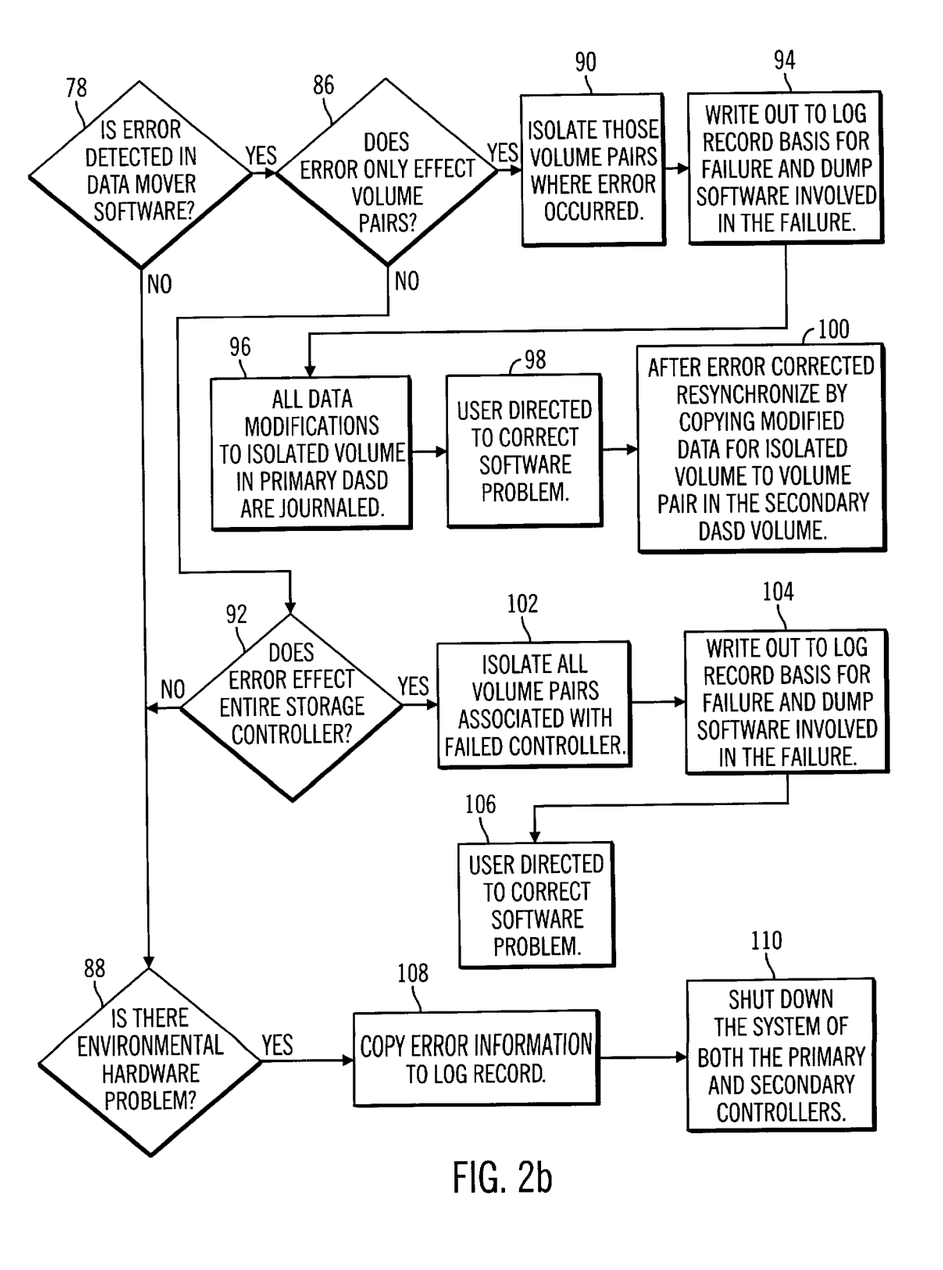

FIGS. 2a and 2b are flowcharts illustrating the logic used by the data mover 20. This logic is provided for illustrative purposes only and different logic may be used to accomplish the same results.

In FIG. 2a, control begins at block 40 which represents the data mover 20 monitoring an input/output (I/O) process from the primary and secondary controllers 4, 12 to their respective DASDs 10, 18. Block 42 is a decision block representing the data mover 20 determining if the I/O process has continued beyond a pre-defined time frame. If the process has lasted longer than the pre-defined time frame, then control transfers to block 44; otherwise, control transfers to block 46. Block 44 represents the data mover 20 suspending the operations associated with the I/O process which proceeded beyond the pre-defined time frame. Control transfers to block 48 which represents the continuation of other I/O processes.

Block 46 represents the data mover 20 determining whether the process has completed with an error. If so, control transfers to block 50; otherwise, control transfers to block 52. If the process completed without an error, then control transfers to block 52 which represents the data mover 20 proceeding to monitor other I/O operations taking place at the primary and secondary controllers 4, 12. If the process completed with an error, then control transfers to block 50 which represents the data mover 20 determining whether the secondary controller 12 failed. If so, control transfers to block 54; otherwise, control transfers to block 56. Block 54 represents the data mover 20 suspending the transfer of further data to the secondary controller 12 to store in the secondary DASD 18. Control transfers to block 58 which represents the data mover 20 writing to the log record 26 information concerning the source of the error. Control then transfers to block 60 which represents the data mover 20 maintaining information on any modifications to data in the primary DASD 10 and the locations of such modifications by updating the journal and control data sets 28. At block 62, after the secondary controller 12 has come back online, the data mover 20 resynchronizes the data in the primary 10 and secondary 18 DASDs by copying all data modified in the primary DASD 10 after the secondary controller 18 failed. The data mover 20 would determine and locate the modified data in the primary DASD 10 by examining the information in the journal, control, and state data sets 28.

Block 56 represents the data mover 20 determining whether there is an error in data read from the cache 8 in the primary controller 4. If there is such an error, control transfers to block 64; otherwise, control transfers to block 66. The data mover 20 can detect if the primary controller 4 is writing incorrect data by examining an information field at the beginning of the data. This information may be included in a header of an ECKD track, which provides information on the origin and location of the data. Such an error in the header information typically indicates that there is an error in the microcode of the primary controller 4 which causes the primary controller 4 to write incorrect data to the cache 8. Such an error must be immediately handled because the accuracy of the data the primary controller 4 is writing to the cache 8, and subsequently backed up in the secondary DASD 18, cannot be guaranteed. If there is such an error in the modified data the primary controller 4 writes to the cache 8, then control transfers to block 64 which represents the data mover 20 isolating the volume pair in the primary and secondary DASDs 10, 18 that includes the track where the error occurred. Control then transfers to block 68 which represents the data mover 20 writing out to the log record 26 information describing the cause of the failure. At block 70, the data mover 20 records information in the journal and control data sets 28 concerning data modifications to the isolated volume pair in the primary DASD 10.

Control transfers to block 72 which represents the primary controller 4 dumping all data stored in the cache 8 which has the errors to a disk or other buffer. The user can then examine the diagnostic information written out to the log record and the errors in the data to correct the problem with the microcode in the primary controller 4. At block 74, after the microcode or other error is corrected, the data mover 20 resynchronizes the primary and secondary DASDs 10, 18 by copying all data written to the primary DASD 10 since the error was detected to the secondary DASD 18 via the secondary controller 12. As discussed, the data mover 20 determines the location of data modifications to the primary DASD 18 by examining the journal, control, and state data sets 28

Block 66 represents the data mover 20 detecting whether there is an error writing to the volumes in the secondary DASD 18. If so, control transfers to block 76; otherwise, control transfers to block 78 in FIG. 2b. Such an error may occur if, for a given volume pair, the secondary DASD 18 volume has a different format or arrangement than the primary DASD 10 volume. For instance, the data mover 20 may determine that it is attempting to write to a record in a track that does not exist in the corresponding track in the secondary DASD 18. The secondary DASD 18 may have only four records in a particular ECKD track, but the data mover 20 may be attempting to write to the fifth record. In such case, at block 76, the data mover 20 suspends writes to the secondary DASD 18 volume where the error is detected. Control transfers to block 80 which represents the data mover 20 writing information to the log record 26 indicating the source of the error. Control then transfers to block 82 which represents the data mover 20 writing information on the location of modifications to data in the primary DASD 10 to the journal and control data sets 28. After the failed volume in the secondary DASD 18 has been corrected, control transfers to block 84 which represents the data mover 20 resynchronizing the primary and secondary DASDs 10, 18 by copying the modified data from the primary DASD 10 to the secondary DASD 18 via the controllers 4, 12.

Block 78 in FIG. 2b represents the data mover 20 determining whether the error is related to the software implementing the logic of the data mover 20. If so, control transfers to block 86; otherwise, control transfers to block 88. Block 86 represents the data mover 20 determining whether the error can be isolated to a volume pair. If so, control transfers to block 90; otherwise control transfers to block 92. Block 90 represents the data mover 20 isolating the volume pairs effected by the software error. Control then transfers to block 94 which represents the data mover 20 writing out the error information to the log record 26 and dumping the software involved in the error to disk or a buffer. Control then transfers to block 96 which represents the data mover 20 writing information on the location of data modifications made to the primary DASD 10 volume in the isolated volume pair to the journal and control data sets 28. Control transfers to block 98 which represents the data mover 20 directing a message to the user to correct the software problem. The user or system administrator would analyze the error information written to the log record 26 and dumped software to diagnose and fix the error. At block 100, the data mover 20 resynchronizes the primary and secondary DASDs 10, 18 in the manner described above after the software error is corrected.

If, at block 86, the data mover 20 determined that the error could not be limited to one or more volume pairs, then control transfers to block 92 which represents the data mover 20 determining whether the software error effects the operation of an entire controller 10, 18. If so, control transfers to block 102; otherwise, control transfers to block 88. Block 102 represents the data mover 20 isolating all volume pairs managed by the failed controller 10, 18. Thus, if there are multiple primary controllers 10, and one fails, I/O operations could still be performed with respect to the volume pairs associated with the surviving controllers. At block 104, the data mover 20 writes error information to the log record 26 and dumps the software involved in the error. At block 106, the data mover 20 generates a message to the user concerning the error and the need for diagnosis and repair.

If the error did not concern the data mover software or effects more than the entire controller, then control transfers to block 88. Block 88 represents the data mover 20 detecting or receiving information of an environmental or system failure, such as a power outage or catastrophic damage to the controllers 10, 18 or links therebetween. Control transfers to block 108 which represents the data mover 20 copying any error information to the log record 26. Control then transfers to block 110 which represents the session ending and the system shutting down.

In this way, preferred embodiments of the present invention isolate errors to the lowest level of operations so as to minimize the impact of such error on system processing. This is particularly important in a real time complex, such as the remote copy system 2 discussed above because there can be thousands of I/O operations occurring at any time. Further, there can be multiple primary and secondary controllers. In such a system, it is particularly advantageous to prevent any one single error, if possible, from interfering with other operations. Preferred embodiments accomplish this goal by isolating those processes and volumes where the error occurred and continuing other operations.

Conclusion

This concludes the description of the preferred embodiments of the invention. The following describes some alternative embodiments for accomplishing the present invention.

Preferred embodiments were described with respect to a hardware arrangement between a primary and secondary controller, and a mover program. Those skilled in the art will appreciate that alternative embodiments could encompass multiple primary and secondary controllers. Moreover, the data mover could be included within the platform housing the primary and secondary controllers or, alternatively, embedded in a separate platform. Still further, there can be multiple primary and/or secondary storage controllers Preferred embodiments of the DASDs were described as being formatted in the ECKD formatted. In alternative embodiments, the DASDs could be formatted in other formats known in the art such as the Fixed Block Architecture (FBA) and count-key-data (CKD) architecture.

In summary, preferred embodiments of the present invention disclose a system for isolating errors in a remote copy system. A first controller writes data to a volume in a first direct access storage device (DASD) and maintains a copy of the data in a cache. The first controller transfers the data in the cache to a host system via a first communication line. The host system then transfers the data transferred from the first controller to a second controller via a second communication line. The second controller writes the data transferred from the host system to a volume in a second DASD. A volume pair is comprised of a volume in the first DASD and a volume in the second DASD, wherein for each volume pair, the second DASD volume backs-up data stored in the first DASD volume. If an error related to a volume pair is detected, then the operation of transferring the data in the cache for the volume pair related to the error to the second controller via the host system is suspended. Information on the detected error is written to a first data set. Further, after the transfer of data from the cache is suspended, information on a location of data written to the first DASD volume in the volume pair related to the error is written to a second data set. The information in the second data set is used to determine the location of data written to the first DASD volume of the volume pair related to the error while the transfer of the data to the second DASD volume of the volume pair is suspended. Upon correction of the error related to the volume pair, data written to the first DASD volume at the determined location is transferred to the second storage controller via the host system for storage in the second DASD volume of the volume pair.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of isolating, errors in a remote copy system, comprising:

writing data with a first controller to a volume in a first direct access storage device (DASD);

maintaining a copy of the data in a cache;

transferring data in the cache with the first controller to a host system via a first communication line;

transferring with the host system the data transferred from the first controller to a second controller via a second communication line;

writing with the second controller the data transferred from the host system to a volume in a second DASD, wherein a volume pair is comprised of a volume in the first DASD and a volume in the second DASD, wherein for each volume pair, the second DASD volume backs-up data stored in the first DASD volume;

detecting an error related to a volume pair;

suspending the transfer of the data in the cache for the volume pair related to the error to the second controller via the host system, wherein updates continue to be written to the first DASD volume of the volume pair related to the error after the suspension;

writing information on the detected error to a first data set;

writing information to a second data set concerning a location of data written to the first DASD volume of the volume pair related to the error after the transfer from the cache of the data for the volume pair related to the error is suspended;

determining with the information in the second data set the location of data written to the first DASD volume of the volume pair related to the error while the copying to the second DASD volume of the volume pair is suspended; and transferring the data written to the first DASD volume at the determined location to the second storage controller via the host system for storage in the second DASD volume of the volume pair upon correcting the error related to the volume pair.

2. The method of claim 1, wherein the error related to the volume pair is caused by a defect in the first controller, and wherein information on the defect is written to the first data set.

3. The method of claim 2, wherein the defect in the first controller causing the error related to the volume pair causes the first controller to write incorrect data to the cache.

4. The method of claim 3, wherein the incorrect data written to the cache is written to a storage area for later diagnosis.

5. The method of claim 1, wherein the error related to the volume pair is caused by a defect in the second DASD volume for the volume pair, and wherein information on the defect in the second DASD volume for the volume pair is written to the first data set.

6. The method of claim 1, wherein there are a plurality of first and second storage controllers, wherein a volume pair is comprised of a volume associated with one of the first storage controllers and a volume associated with one of the second storage controllers, wherein the step of detecting the error further comprises the step of detecting the failure of one of the first and second storage controllers, and wherein the step of suspending operations occurs with respect to all volume pairs associated with the failed first and second storage controllers.

7. The method of claim 1, wherein the error related to the volume pair is caused by an error in software within the host system, further comprising the steps of:
   copying the software including the error to a storage area for later diagnosis; and
   writing information to the first data set concerning the problem with the host system software.

8. A system for isolating errors in a remote copy system, comprising:
   a first controller;
   a first direct access storage device (DASD) in communication with the first storage controller, wherein the first storage controller writes data to a volume in the first DASD;
   a cache associated with the first controller; wherein the first controller writes a copy of the data written to the first DASD to the cache;
   a host system, wherein the first controller transfers the data in the cache to the host system via a first communication line;
   a second controller linked to the host system via a second communication line, wherein the host system transfers the data transferred from the first controller to the second controller via the second communication line;
   a second DASD in communication with the second controller, wherein the second controller copies the data transferred from the host system to a volume in the second DASD, wherein a volume pair is comprised of a volume in the first DASD and a volume in the second DASD, wherein for each volume pair, the second DASD volume backs-up data stored in the first DASD volume;
   means, performed by the host system, for detecting an error related to a volume pair;
   means, performed by the host system, for suspending the transfer of the data in the cache for the volume pair related to the error to the second controller via the host system, wherein updates continue to be written to the first DASD volume of the volume pair related to the error after the suspension;
   a first data set including information on the detected error;
   a second data set including information on a location of data written to the first DASD volume in the volume pair related to the error in a second data set after the transfer from the cache of the data for the volume pair related to the error is suspended;
   means, performed by the host system, for determining with the information in the second data set the location of data written to the first DASD volume of the volume pair related to the error while the copying to the second DASD volume of the volume pair is suspended; and
   means, performed by the host system, for transferring the data written to the first DASD volume at the determined location to the second storage controller via the host system for storage in the second DASD volume of the volume pair upon correcting the error related to the volume pair.

9. The system of claim 8, wherein the error related to the volume pair is caused by a defect in the first controller, further including means for writing information on the defect to the first data set.

10. The system of claim 9, wherein the defect in the first controller causing the error related to the volume pair causes the first controller to write incorrect data to the cache.

11. The system of claim 10, further including means for writing the incorrect data written to the cache to a storage area for later diagnosis.

12. The system of claim 8, wherein the error related to the volume pair is caused by a defect in the second DASD volume for the volume pair, further including means for writing information on the defect in the second DASD volume for the volume pair to the first data set.

13. The system of claim 8, further comprising:
   a plurality of first and second storage controllers;
   a volume pair comprised of a volume associated with one of the first storage controllers and a volume associated with one of the second storage controllers, wherein the means, performed by the host system, for detecting the error further comprises means for detecting the failure of one of the first and second storage controllers, and wherein the means for suspending operations occurs with respect to all volume pairs associated with the failed first and second storage controllers.

14. The system of claim 8, wherein the error related to the volume pair is caused by an error in software within the host system, further comprising:
   means, performed by the host system, for copying the software including the error to a storage area for later diagnosis; and
   means, performed by the host system, for writing information to the first data set concerning the problem with the host system software.

15. The system of claim 8, further comprising:
   a first platform including the first controller and the first DASD;
   a second platform including the second controller and the second DASD; and
   a third platform including the host system.

16. An article of manufacture comprising a proprogram storage medium readable by a host system having a memory, the medium tangibly embodying one or more programs of instructions executable by the host system, wherein the host system is in communication with a first controller via a first communication line, wherein the first controller writes data to an associated first direct access storage device (DASD) and maintains a copy of the data written to the first DASD in a cache, wherein the host system is in communication with a second controller via a second communication line, wherein the second controller writes data to an associated second DASD, and wherein the computer storage medium causes the host system to perform the steps of:
   directing the first controller to transfer data in the cache to the host system via the first communication line;
   transferring the data transferred from the first controller to the second controller via the second communication line, wherein the second controller copies the data transferred from the host system to a volume in the second DASD, wherein a volume pair is comprised of a volume in the first DASD and a volume in the second DASD, and wherein for each volume pair, the second DASD volume backs-tip data stored in the first DASD volume; detecting an error related to a volume pair;

suspending the transfer of the data in the cache for the volume pair related to the error to the second controller via the host system, wherein updates continue to be written to the first DASD volume of the volume pair related to the error after the suspension;

writing information on the detected error to a first data set;

writing information to a second data set concerning a location of data written to the first DASD volume in the volume pair related to the error after the transfer of data from the cache for the volume pair related to the error is suspended;

determining with the information in the second data set the location of data written to the first DASD volume of the volume pair related to the error while the copying to the second DASD volume of the volume pair is suspended; and directing the first controller to transfer the data written to the first DASD volume at the determined location to the second storage controller via the host system for storage in the second DASD volume of the volume pair upon correcting the error related to the volume pair.

17. The article of manufacture of claim 16, wherein the error related to the volume pair is caused by a defect in the first controller, and wherein the host system writes information on the defect to the first data set.

18. The article of manufacture of claim 17, wherein the defect in the first controller causing the error related to the volume pair causes the first controller to write incorrect data to the cache.

19. The article of manufacture of claim 18, wherein the host system directs the primary storage controller to transfer the incorrect data written to the cache to a storage area for later diagnosis.

20. The article of manufacture of claim 16, wherein the error related to the volume pair is caused by a defect in the second DASD volume for the volume pair, and wherein the host system writes information on the defect in the second DASD volume for the volume pair to the first data set.

21. The article of manufacture of claim 16, wherein there are a plurality of first and second storage controllers, wherein a volume pair is comprised of a volume associated with one of the first storage controllers and a volume associated with one of the second storage controllers, wherein the step of detecting the error further comprises the step of detecting the failure of one of the first and second storage controllers, and wherein the step of suspending operations occurs with respect to all volume pairs associated with the failed first and second storage controllers.

22. The article of manufacture of claim 16, wherein the error related to the volume pair is caused by an error in software within the host system, further causing the host system to perform the steps of:

copying the software including the error to a storage area for later diagnosis; and writing information to the first data set concerning the problem with the host system software.

23. A method for isolating errors in a storage system including first and second storage devices forming storage volumes, wherein updates written to the first storage volume are transferred to the second storage volume, wherein a volume pair is comprised of a volume in the first storage device and a volume in the second storage device, wherein for each volume pair, the second storage device volume backs-up data stored in the first storage device volume, comprising:

detecting an error related to one volume pair;

suspending the transfer of data between the first and second storage devices for the volume pair related to the error wherein updates continue to be written to the first storage volume of the suspended error following the suspension;

writing information to a data set concerning a location of data written to the first storage device volume of the suspended volume pair after the suspension; and using the location information in the data to transfer data from the first storage device volume to the second storage device volume upon correcting the error related to the volume pair.

* * * * *

UNITED STATES PATENT AND TRADEMARK OFFICE
CERTIFICATE OF CORRECTION

PATENT NO. : 6,052,758
DATED : April 18, 2000
INVENTOR(S) : Crockett et al.

It is certified that error appears in the above-identified patent and that said Letters Patent are hereby corrected as shown below:

In the Title, delete "DASD" and insert (DASD)

Col. 10, line 51, delete "proprogram" and insert program

Col. 11, line 6, delete "backs-tip" and insert backs-up

Col. 11, line 7, after "volume;" move "detecting an error related to a volume pair;" to a new line

Col. 12, line 24, delete "arc" and insert are

Col. 12, line 33, after "error" insert ,

Signed and Sealed this

Twenty-second Day of May, 2001

*Attest:*

NICHOLAS P. GODICI

*Attesting Officer*  *Acting Director of the United States Patent and Trademark Office*